United States Patent
Saito et al.

(10) Patent No.: US 8,241,484 B2
(45) Date of Patent: Aug. 14, 2012

(54) MEMBRANE TREATMENT METHOD AND MEMBRANE TREATMENT APPARATUS FOR BALLAST WATER USING MEMBRANE MODULE

(75) Inventors: Masahiro Saito, Tokyo (JP); Gaku Taniguchi, Tokyo (JP); Taishi Sato, Tokyo (JP); Satoru Okada, Tokyo (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 962 days.

(21) Appl. No.: 12/294,666

(22) PCT Filed: Mar. 28, 2007

(86) PCT No.: PCT/JP2007/056741
§ 371 (c)(1),
(2), (4) Date: Sep. 26, 2008

(87) PCT Pub. No.: WO2007/114198
PCT Pub. Date: Oct. 11, 2007

(65) Prior Publication Data
US 2010/0163413 A1 Jul. 1, 2010

(30) Foreign Application Priority Data
Mar. 31, 2006 (JP) .................. 2006-099157

(51) Int. Cl.
*C02F 1/461* (2006.01)
(52) U.S. Cl. ........ 205/701; 205/766; 205/687; 205/688; 204/242
(58) Field of Classification Search .................. 205/687, 205/688, 701, 766; 204/242
See application file for complete search history.

(56) References Cited

U.S. PATENT DOCUMENTS
4,624,760 A * 11/1986 Pottinger et al. .............. 205/712

FOREIGN PATENT DOCUMENTS
| JP | 2003265935 | 9/2003 |
| JP | 2005185206 | 7/2005 |
| JP | 2005-313143 | * 11/2011 |

* cited by examiner

*Primary Examiner* — Arun S Phasge
(74) *Attorney, Agent, or Firm* — K. David Crockett, Esq.; Niky Economy Syrengelas, Esq.; Crockett & Crockett, PC

(57) ABSTRACT

[Problem] To provide a membrane treatment method and a membrane treatment apparatus for ballast water using a membrane module, which are capable of inhibiting the formation of scale on the membrane surface to reduce fouling, using a simple installation.

[Means for Solving the Problem] The membrane treatment method and the membrane treatment apparatus for ballast water using a membrane module according to the invention, having a membrane treatment tank 2 and a membrane module 1 provided in the tank for continuously performing filtration while ballast water is being passed thereto as raw water; wherein a positive electrode and a negative electrode are provided in the membrane treatment tank 2 so as to come into contact with raw water in the tank, and a current passing means is provided in the tank for applying a voltage between the electrodes.

2 Claims, 2 Drawing Sheets

MEMBRANE TREATMENT METHOD AND MEMBRANE TREATMENT APPARATUS FOR BALLAST WATER USING MEMBRANE MODULE

TECHNICAL FIELD

The present invention relates to a membrane treatment method and a membrane treatment apparatus for ballast water using a membrane module, which are capable of preventing microorganisms and bacteria in seawater through membranes to thereby supply ballast water not containing microorganisms and the like with a predetermined size or more into ballast tanks. More particularly, the invention relates to a membrane treatment method and a membrane treatment apparatus for ballast water using a membrane module, which are capable of inhibiting the formation of scale on the membrane surface during long-term operation, to thereby reduce the frequency of clarification and increase the recovery rate of treated water.

BACKGROUND ART

Tankers and other cargo ships are furnished with ballast tanks for maintaining the stability of the ship during traveling. The ballast tanks are typically filled with water when the ship is not loaded with oil or other cargo, and emptied when the ship is loaded. The buoyancy of the ship is thus re-adjusted to stabilize the ship.

Ballast water, essential as above for the safety of seagoing vessels, is normally the seawater taken in at the ports where the ships are unloaded of their cargo. It is estimated that, worldwide, as much as well over 10,000,000,000 tons of seawater is being used annually for ballasting ships.

Ballast water contains microorganisms and eggs of large or small organisms, which inhabited the ports where the water was taken in. As the ship travels the oceans, such microorganisms and eggs of large or small organisms contained in the ballast water are also transported to foreign countries.

Therefore, exotic species, which have not originally inhabited the destination ports, replace the native species, causing serious destruction of the ecosystems.

In light of these situations, a diplomatic conference at International Maritime Organization (IMO) made it obligatory to conduct regular tests for ballast water treatment equipment and the like, and this obligation will apply to ships constructed after 2009.

The ballast water performance standards of the Convention for the Control and Management of Ships' Ballast Water and Sediments (hereinafter referred to as the Convention) require that ships conducting ballast water management shall discharge:

TABLE 1

| Items | Ballast Water Quality Criteria | Size |
|---|---|---|
| Plankton | 10 Unit/ml | 10 to 50 μm |
| Plankton | 10 Unit/m$^3$ | 50 μm or more |
| *Escherichia Coli* | 250 cfu/100 ml | 0.5 to 3 μm |
| *Vibrio Cholerae* | 1 cfu/100 ml | 0.5 to 3 μm |
| Genus *Enterococcus* | 100 cfu/100 ml | 0.5 to 3 μm |

For these reasons, the development of a method for treating ballast water, which can reduce the concentration of microorganisms in ballast water to be discharged to approximately one hundredth of those in outer oceans, has become an urgent need. As a technique for disinfecting ballast water, a membrane treatment method using a membrane module has previously been proposed.

Because ballast water (seawater) is high in ionic concentration, when it is treated using a membrane module, scale may form on the membrane surface during long-term operation. If such scale, which mainly includes sodium chloride (NaCl) and calcium sulfate (CaSO$_4$), adheres to or builds up on the membrane surface, the membranes may be clogged or broken. Moreover, if the scale incorporates organic matter therein to form a solid mass, it cannot be removed even by backwashing.

Therefore, in membrane treatment methods, it is important to reduce fouling in order to extend the membrane treatment time. To reduce fouling during membrane treatment, patent document 1 discloses a technique for reducing fouling by utilizing expansion of bubbles by reducing pressure.

Patent document 2 discloses a technique in which a constant current is applied between an anti-fouling conductive member and a counter electrode to thereby inhibit the adhesion of organisms on the surface of the anti-fouling conductive member of an aquatic structure or the like in contact with seawater, thereby preventing contamination of the conductive member.

Patent document 1: JP 2003-265935 A
Patent document 2: JP 2005-185206 A

DISCLOSURE OF THE INVENTION

Problems to be Solved by the Invention

The technique disclosed in patent document 1 requires a pressure-reducing means to reduce pressure in the tank equipped with a membrane module, resulting in increased installation costs.

The technique disclosed in patent document 2 is intended to prevent contamination of the conductive member, and does not solve problems with scale formed on the membrane surface.

Accordingly, it is an object of the invention to provide a membrane treatment method and a membrane treatment apparatus for ballast water using a membrane module, which are capable of inhibiting the formation of scale on the membrane surface to reduce fouling, using a simple installation.

Other objects of the invention will become apparent from the following description.

Means for Solving the Problems

The above-described object is solved by the inventions set forth below.

One method that achieves these goals is providing a membrane treatment method for ballast water using a membrane module, the method having a membrane treatment tank and a membrane module provided in the tank for continuously performing filtration while ballast water is being passed thereto as raw water; the method comprising providing a positive electrode and a negative electrode in the membrane treatment tank so that the electrodes come into contact with raw water in the tank; and applying a voltage between the electrodes.

Another method that achieves these goals further includes one of the positive and negative electrodes is formed on a wall surface of the membrane treatment tank, and the other electrode is formed on a wall surface of the membrane module.

A new apparatus achieving these goals is a membrane treatment apparatus for ballast water using a membrane module, the apparatus having a membrane treatment tank and a membrane module provided in the tank for continuously performing filtration while ballast water is being passed thereto as raw water; the apparatus comprising a positive electrode and a negative electrode provided in the membrane treatment tank so that the electrodes come into contact with raw water in the tank; and a current passing means provided in the tank for applying a voltage between the electrodes.

Another apparatus that achieves these goals further includes one of the positive and negative electrodes is formed on a wall surface of the membrane treatment tank, and the other electrode is formed on a wall surface of the membrane module.

Effects of the Invention

The invention provides a membrane treatment method and a membrane treatment apparatus for ballast water using a membrane module, which are capable of inhibiting the formation of scale on the membrane surface to reduce fouling, using a simple installation.

EXPLANATION OF REFERENCE NUMERALS

Figure 1:
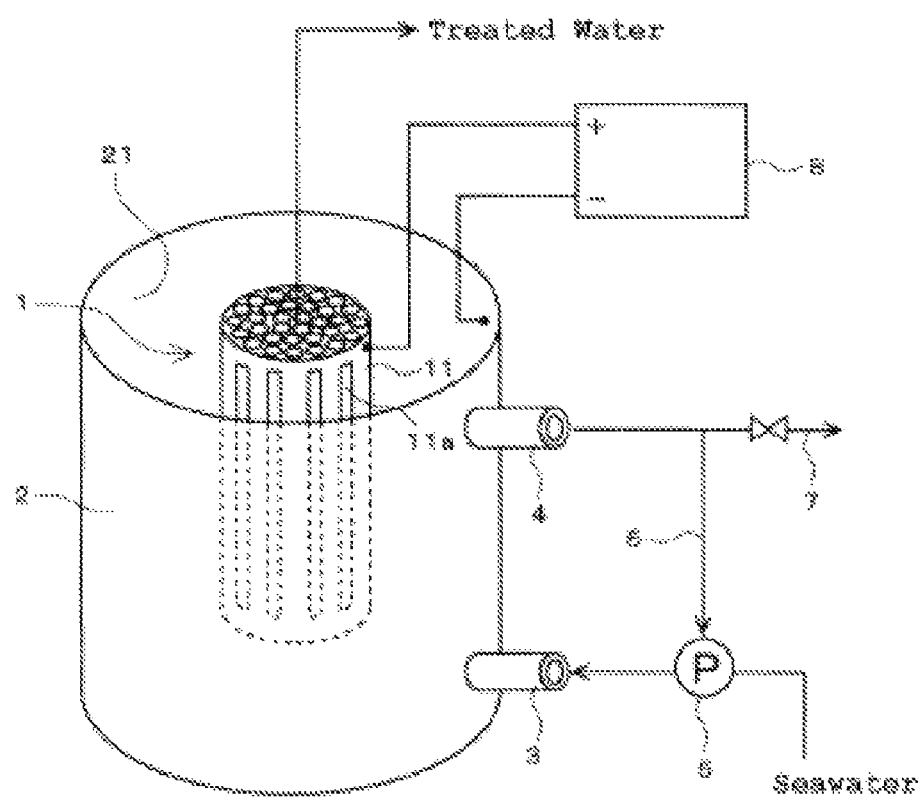
FIG. 1 is a schematic perspective view illustrating an example of an apparatus for performing the membrane treatment method for ballast water using a membrane module according to the invention.

1: membrane module
  11: outer frame (electrode)
2: membrane treatment tank
  21: inner wall surface (electrode)
3: raw-water inlet pipe
4: raw-water outlet pipe
5: raw-water pump
6: circulation piping
7: outlet pipe for suspended solids
8: power supply device

BEST MODE FOR CARRYING OUT THE INVENTION

Embodiments of the invention will hereinafter be described with reference to the drawings.

FIG. 1 is a schematic perspective view illustrating an example of an apparatus for performing the membrane treatment method for ballast water using a membrane module according to the invention.

In FIG. 1, reference numeral 1 denotes a membrane module that can be installed in vessels such as tankers and the like. Reference numeral 2 denotes a cylindrical membrane treatment tank having the membrane module 1 installed in the center thereof.

Reference numeral 3 denotes a raw-water inlet pipe, and numeral 4 denotes a raw-water outlet pipe. Reference numeral 5 denotes a raw-water pump, numeral 6 denotes circulation piping, numeral 7 denotes an outlet pipe for suspended solids, and numeral 8 denotes a power supply device.

Multiple slit openings 11a are formed in the wall surface of an outer frame 11 of the membrane module 1, and raw water in the membrane treatment tank 2 is fed into the membrane module 1 through the openings 11a.

The outer frame 11 of the membrane module 1 is formed of an electrically conductive metal material, and is connected to the positive electrode of the power supply device 8 located outside the membrane treatment tank 1. Therefore, the outer frame 11 of the membrane module 1 herein functions as a positive electrode.

In the membrane treatment tank 2, at least an inner wall surface 21 in contact with raw water is formed of an electrically conductive metal material, and the inner wall surface 21 is connected to the negative electrode of the power supply device 8. Therefore, the inner wall surface 21 of the membrane treatment tank 2 functions as a negative electrode.

The power supply device 8 applies a predetermined voltage between the outer frame 11 of the membrane module 1 that functions as a positive electrode and the inner wall surface 21 of the membrane treatment tank 2 that functions as a negative electrode to pass a current therebetween.

Figure 2:
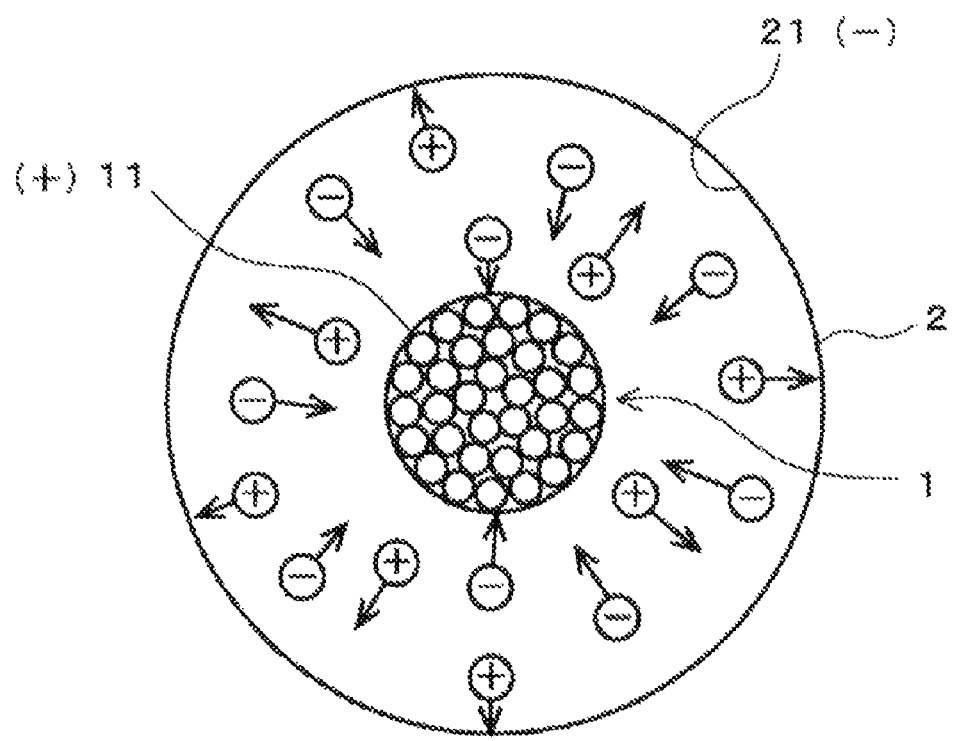
FIG. 2 is a diagram illustrating the migration of ions in the raw water in a membrane treatment tank.

By passing a current through the application of a voltage between the outer frame 11 of the membrane module 1 and the inner wall surface 21 of the membrane treatment tank 2, positive ions ($Na^+$, $Ca^{2+}$, $Mg^{2+}$, $Fe^{3+}$, $Mn^{2+}$, etc.) of the raw water (seawater) in the membrane treatment tank 2 migrate toward the inner wall surface 21 of the membrane treatment tank 2, i.e., the negative electrode, by the electric force, and negative ions ($Cl^-$, $SO_4^{2-}$, etc.) migrate toward the outer frame 11 of the membrane module 1, i.e., the positive electrode, by the electric force, as illustrated in FIG. 2.

Fouling substances such as NaCl, $CaSO_4$, etc. in the raw water are thus decomposed into positive ions and negative ions, which are separated toward different electrodes. Therefore, such fouling substances are not present near the membrane module 1 in the center of the membrane treatment tank 2, preventing adhesion and deposition of these substances on the membrane surface.

This extends the membrane treatment duration per circulation cycle. That is to say, the recovery efficiency (the recovery rate) of treated water increases.

The inventors conducted seawater filtration experiments using MF (microfiltration) membranes with a nominal pore size of 0.4 μm, to examine the filtration duration when seawater was filtered using a membrane treatment apparatus having the structure as shown in FIG. 1 but not including electrodes, and the filtration duration when seawater was filtered using a membrane treatment apparatus having the structure as shown in FIG. 1, in which the outer frame 11 of the membrane module 1 functions as a positive electrode and the inner wall surface 21 of the membrane treatment tank 2 functions as a negative electrode, and a voltage of several mmV to several V is applied between the electrodes. The filtration rate was set to 5 m/day (constant), and the time required until the differential pressure increased to 50 kPa was 20 minutes for the case without electrodes, whereas the duration was 25 minutes for the case in which the electrodes were used and a current was applied.

As illustrated in FIG. 1, it is preferred that electrodes are formed on the outer frame 11 of the membrane module 1 and on the inner wall surface 21 of the membrane treatment tank 2, because separate electrode members need not be provided in the membrane treatment tank 2 in this way, resulting in a simple structure of the membrane treatment tank 2.

In another embodiment, a positive electrode and a negative electrode in the form of a plate or a bar may be provided at a distance from each other between the membrane module 1 and the wall surface of the membrane treatment tank 2, so as to come into contact with the raw water in the membrane treatment tank 2.

The positions of the positive electrode and negative electrode of the embodiment shown in FIG. 1 may be reversed.

When the outer frame 11 of the membrane module 1 is formed as an electrode, the openings 11a are not limited to the slit openings illustrated in the figure, and may also be circular or rectangular, or the openings may be formed using a meshed outer frame.

When an electrode is formed on the inner wall surface 21 of the membrane treatment tank 2, it may be formed on a portion, or the entire surface, of the inner wall surface 21 of the membrane treatment tank 2.

The shape of the membrane treatment tank 2 is not particularly limited to the cylindrical shape as illustrated in the figure, and may instead be oval or rectangular.

In the invention, the membrane module 1 may be a cylindrical membrane module or a rectangular membrane module. In addition, in the invention, the membrane module 1 may be located in any position other than the center of the membrane treatment tank 2.

Although the membrane module 1 allows the separation of microorganisms with a predetermined size or more from the raw water, it is preferable to additionally perform ozonation to sterilize minute microorganisms (bacteria and the like) that have passed through the membranes, to thereby obtain clear ballast water.

The invention claimed is:

1. A membrane treatment method for ballast water comprising the steps of:
    providing a membrane module;
    providing a membrane treatment tank with the membrane module positioned within the tank and provided with a separation membrane inside an outer frame, the membrane module adapted to continuously perform filtration while ballast water is being passed therethrough as raw water;
    providing a positive electrode and a negative electrode in the membrane treatment tank, one of the positive electrodes and negative electrodes formed by a wall surface of the membrane treatment tank, and the other formed by a wall surface of the outer frame of the membrane module, so that the electrodes come into contact with raw water in the tank; and
    applying a constant voltage between the electrodes.

2. A membrane treatment apparatus for ballast water that uses a membrane module comprising:
    a membrane treatment tank;
    a membrane module positioned within the tank and provided with a separation membrane inside an outer frame and operable to continuously perform filtration while ballast water is being passed therethrough as raw water;
    a positive electrode and a negative electrode provided in the membrane treatment tank, one of the positive electrodes and negative electrodes formed by a wall surface of the membrane treatment tank, and the other formed by a wall surface of the outer frame of the membrane module, so that the electrodes come into contact with raw water in the tank; and
    and a current passing means provided in the tank for applying a constant voltage between the electrodes.

* * * * *